(12) United States Patent
Visinoni-Davidov

(10) Patent No.: US 11,414,574 B1
(45) Date of Patent: Aug. 16, 2022

(54) COMPOSTABLE BIOPOLYMER ADHESIVE

(71) Applicant: Ana Maria Visinoni-Davidov, Plano, TX (US)

(72) Inventor: Ana Maria Visinoni-Davidov, Plano, TX (US)

( * ) Notice: Subject to any disclaimer, the term of this patent is extended or adjusted under 35 U.S.C. 154(b) by 26 days.

(21) Appl. No.: 17/093,427

(22) Filed: Nov. 9, 2020

Related U.S. Application Data

(63) Continuation-in-part of application No. 16/160,823, filed on Oct. 15, 2018, now Pat. No. 10,858,550.

(60) Provisional application No. 62/567,986, filed on Oct. 4, 2017.

(51) Int. Cl.
*C09J 103/00* (2006.01)
*C09J 103/02* (2006.01)
*C09J 191/06* (2006.01)

(52) U.S. Cl.
CPC ........... *C09J 103/02* (2013.01); *C09J 191/06* (2013.01)

(58) Field of Classification Search
None
See application file for complete search history.

(56) References Cited

U.S. PATENT DOCUMENTS

2016/0038629 A1* 2/2016 Carty ..................... A61L 24/06
424/443
2018/0355162 A1* 12/2018 Skuratowicz ............. C08L 3/00

FOREIGN PATENT DOCUMENTS

CA         2021134 A  *  1/1992

OTHER PUBLICATIONS

CA-2021134-A—English translation (Year: 2018).*

* cited by examiner

*Primary Examiner* — Stefanie J Cohen
(74) *Attorney, Agent, or Firm* — Plager Schack LLP; Mark H. Plager; Kara Verryt

(57) ABSTRACT

A compostable biopolymer adhesive may include a starch, a hydroxylic liquid, a preservative mixture, a crystallization inhibitor, and a carbonate, wherein the compostable biopolymer may be free of synthetic materials yet has a long shelf life, is stable at room temperature, and which can be used to make slime for play. The preservative mixture may include a mixture of saccharides and salt, and the salt may make up about 10 to about 90 wt. % of the dry materials used to make the compostable biopolymer adhesive.

10 Claims, No Drawings

COMPOSTABLE BIOPOLYMER ADHESIVE

RELATED APPLICATION

This application is a continuation of and claims priority to non-provisional patent application U.S. Ser. No. 16/160,823 filed on Oct. 15, 2018, now U.S. Pat. No. 10,858,550, the entire contents of which is herein incorporated by reference.

BACKGROUND

The embodiments herein relate generally to adhesives, and more particularly, to a compostable biopolymer adhesive with a long shelf life at room temperature that may also be used as slime for play.

Parents are increasingly averse to the use of children's arts and crafts supplies made with synthetic chemicals, even if the chemicals are non-toxic. Additionally, while durability is a desirable characteristic, the use of synthetic biocides is an objectionable characteristic in products marketed as "all natural" or "organic." Although existing biopolymer adhesives are more environmentally friendly alternatives to petroleum-based adhesives, these biopolymer adhesives use synthetic biocides or synthetic cross-linking agents in their manufacturing processes. In addition, widespread consumer use of polyvinyl acetate based adhesives to make a non-Newtonian liquid commonly known as "slime" by adding borax, a known toxic agent, to be used as a toy has spurred increased attention to the need for a non-toxic way of making slime without borax.

Therefore, what is needed is a synthetic-free biopolymer adhesive that is starch based, yet displays acceptable shelf life and which may be used to make "slime" with all natural, plant based ingredients.

SUMMARY

Some embodiments of the present disclosure include a compostable biopolymer adhesive. The compostable biopolymer adhesive may include a starch, a hydroxylic liquid, a preservative mixture, a crystallization inhibitor, and a carbonate, wherein the compostable biopolymer may be free of synthetic materials.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an adhesive or as a non-Newtonian liquid, or "slime," for play and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Starch
b. Hydroxylic Liquid
c. Naturally-Derived Preservative Mixture
d. Naturally-Derived Crystallization Inhibitor
e. Carbonate The various elements of the device of the present disclosure may be related in the following exemplary fashion. It is not intended to limit the scope or nature of the relationships between the various elements and the following examples are presented as illustrative examples only.

By way of example, some embodiments of the present disclosure include a biopolymer adhesive that may also be used as slime for play, the biopolymer adhesive comprising a starch, a hydroxylic liquid, a naturally-derived preservative mixture, a naturally-derived crystallization inhibitor, and a carbonate. The adhesive may also optionally include a protein additive, which may be added during hydration to increase the degree of adhesiveness. Additionally, beeswax granules, such as about 5 to about 50 wt % may be added to the adhesive to increase the viscosity of the adhesive into a paste suitable for use as a glue stick. Moreover, colorants, such as those sourced from plants, may be added for use of the adhesive as a stable base for a natural, chemical free paint. Lastly, additives, such as gums, may be added to increase the viscosity for use of the adhesive as chemical free, petroleum free glue dots. The adhesive may have a shelf life of at least about 6 months and may be made without the use of any synthetic chemicals, including no biocides.

To create "slime," cornstarch may be added to the adhesive, wherein kneading the mixture may result in the adhesive acquiring certain non-Newtonian characteristics that make it suitable for use as play "slime." Thus, the adhesive may constitute a natural alternative to the polyvinyl acetate and borax mixture currently commonly used by children.

In embodiments, the feed starch may comprise a dry feed starch or a prewetted material. When feeding dry starch, a suitable quantity of a hydroxylic liquid, such as water, may be continuously or intermittently fed early in the manufacturing process to provide a wetting medium for the feed starch particles. However, it is also suitable to use a milled starch that has not been dried, such as a slurry filter cake, as a feed material. The feed starch may be selected from a wide variety of sources, including corn, potato, tapioca, rice, wheat, barley, and the like, including waxy, native, and high amylose starches. Moreover, mixtures of starches may be used.

The hydroxylic liquid may be any suitable hydroxylic liquid and, in embodiments, may include water, such as water purified using reverse osmosis, an alcohol, or mixtures thereof.

The naturally-derived preservative mixture may include a mixture of saccharides and salt. The salt may make up about 10 to about 90 wt. %, such as from about 30 to about 70 wt. %, such as from about 40 to about 50 wt. %, of the dry materials used to make the adhesive.

The naturally-derived crystallization inhibitor may be potassium bitartrate. A particular embodiment of the adhesive may comprise about 0.5 to about 2.5 wt. % potassium bitartrate.

The carbonate may be calcium carbonate, wherein some embodiments of the adhesive may include up to about 20 wt. % calcium carbonate.

In a particular embodiment, the compostable biopolymer adhesive may comprise about 3 to about 8 wt. % starch; about 40 to about 80 wt. % of the hydroxylic liquid; about 10 to about 25 wt. %, such as about 10 to about 20 wt. % of the preservative mixture; about 0.5 to about 2 wt. % of the crystallization inhibitor; and about 2 to about 20 wt. % carbonate.

To make the adhesive of the present disclosure, the dry ingredients, including the starch and/or plant proteins, saccharides, salt, crystallization inhibitor, acid modifier, and calcium carbonate may be mixed together. Water may then be added to disperse to completely surround the starch molecules with water and, thus, avoid clumping. The starch molecules may be hydrated by gradually heating the liquid. The mixture may be heated beyond a critical temperature, which may be, for example, about 56° depending on the starch, or the mixture may be boiled for about 5 to about 30 minutes under constant shear. Pasteurization or ultra-pasteurization processes may be used. Following the application of heat, the starch dispersion may be transferred to a separate vessel, such as a vessel with mechanical agitation means, where rapid cool-down techniques may be employed. The rapid cool-down may reduce the risk of microbial growth. The resulting adhesive may then be packaged for transport, storage, or sale.

By mixing all of the dry ingredients at once, the starch may be forced to compete for water with the salt and saccharides simultaneously during hydration while, at dispersion, the acid and calcium carbonate react to each other, thus allowing no variation in the pH of the slurry. Application of the heat from about 5-30 minutes at about 100° C. allows the starch's granules to reach maximum hydration, then rupture and yield an elastic, retroregradation-prone solution.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A compostable biopolymer adhesive comprising:
   a starch;
   a hydroxylic liquid;
   a preservative mixture comprising a mixture of saccharides and salt;
   a crystallization inhibitor; and
   a carbonate,
   wherein:
      the compostable biopolymer adhesive is free of synthetic materials;
      the compostable biopolymer adhesive comprises dry materials; and
      the salt makes up about 10 to about 90 wt. % of the dry materials.

2. The compostable biopolymer adhesive of claim 1, further comprising a protein additive.

3. The compostable biopolymer adhesive of claim 1, further comprising beeswax granules.

4. The compostable biopolymer adhesive of claim 1, wherein the crystallization inhibitor comprises potassium bitartrate.

5. The compostable biopolymer adhesive of claim 4, wherein the compostable biopolymer adhesive comprises about 0.5 to about 2.5 wt. % potassium bitartrate.

6. The compostable biopolymer adhesive of claim 1, wherein the carbonate comprises calcium carbonate.

7. The compostable biopolymer adhesive of claim 6, wherein the compostable biopolymer adhesive comprises about 20 wt. % calcium carbonate.

8. The compostable biopolymer adhesive of claim 1, comprising:
   about 3 to about 8 wt. % starch;
   about 40 to about 70 wt. % hydroxylic liquid;
   about 10 to about 25 wt. % preservative mixture;
   about 0.5 to about 2 wt. % crystallization inhibitor; and
   about 2 to about 20 wt. % carbonate.

9. The compostable biopolymer of claim 1, wherein the salt makes up about 30 to about 70 wt. % of the dry materials.

10. A method of making a compostable biopolymer adhesive with a long shelf life, the method comprising:
   mixing starch, a preservative mixture comprising a mixture of saccharides and salt, a crystallization inhibitor, and a carbonate to create a dry ingredient mixture, wherein the salt makes up about 10 to about 90 wt. % of the dry ingredient mixture;
   adding a hydroxylic liquid to the dry ingredient mixture creating a wet mixture;
   heating the wet mixture;
   pasteurizing the wet mixture; and
   cooling the wet mixture.

* * * * *